Dec. 14, 1948.   J. H. SAUTER ET AL   2,456,327
METHOD OF AND MEANS FOR SLABBING CAKES
Filed Dec. 13, 1945
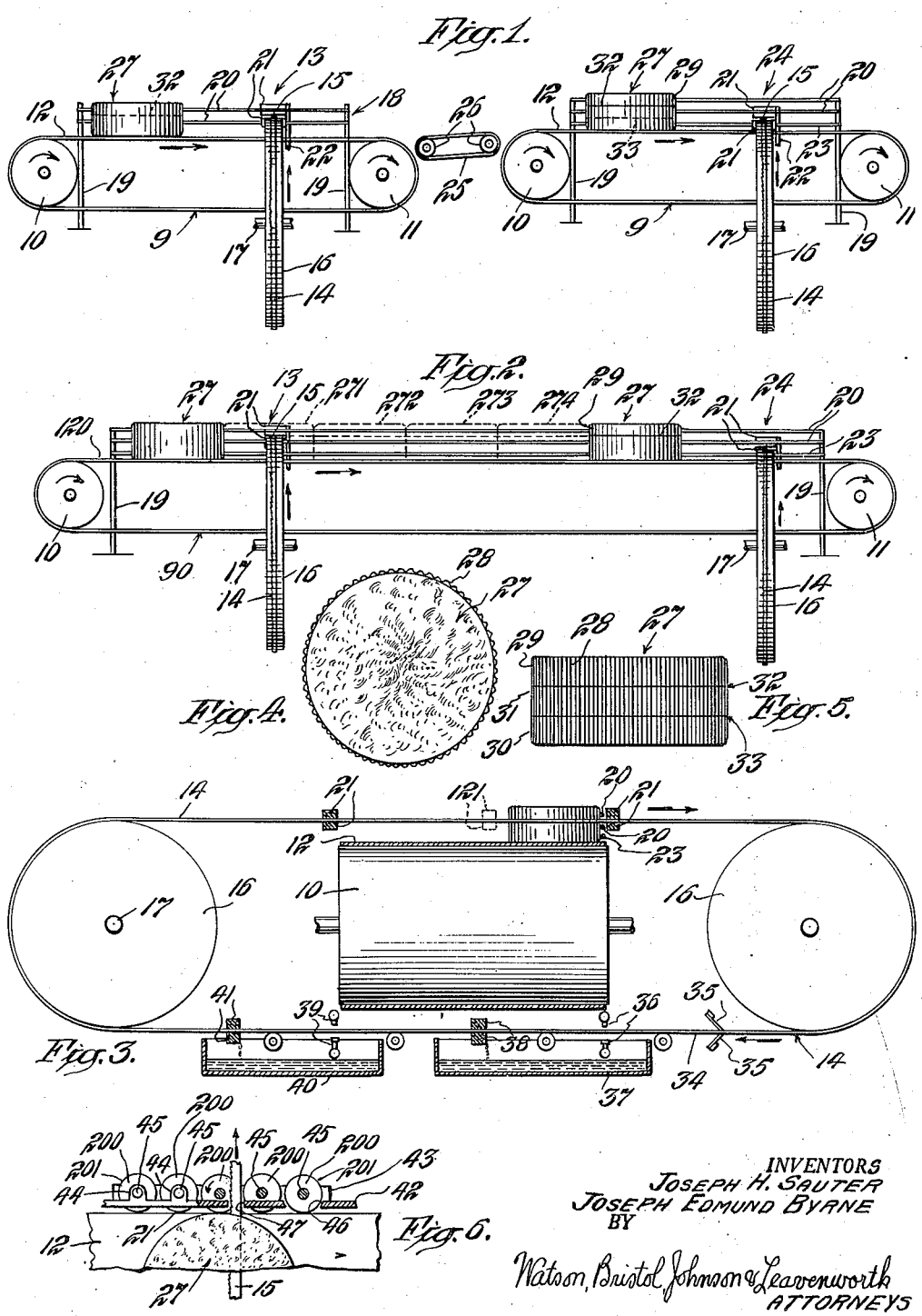
INVENTORS
JOSEPH H. SAUTER
JOSEPH EDMUND BYRNE
BY
Watson, Bristol, Johnson & Leavenworth
ATTORNEYS Patented Dec. 14, 1948

2,456,327

UNITED STATES PATENT OFFICE 2,456,327

METHOD OF AND MEANS FOR SLABBING CAKES

Joseph H. Sauter, Rutherford, N. J., and Joseph Edmund Byrne, New Rochelle, N. Y., assignors to General Baking Company, New York, N. Y., a corporation of New York Application December 13, 1945, Serial No. 634,796

10 Claims. (Cl. 146—241)

The present invention relates to the slabbing of cakes into layers and, more particularly, to a method of subdividing a substantially solid mass or block of crumbly material, such as a baked loaf of edible composition, into substantially horizontal layers and apparatus for accomplishing that end.

A general object of the present invention is to provide an efficient and simple method of and effective, readily and economically constructed and operated apparatus for dividing cakes of crumbly material, such as bakery products, e. g., fruit cakes and the like, into horizontal layers without substantially disturbing the previous relative positions of the parts, so that each layered cake may be packed and distributed as a single unit, such layering being carried out with minimum tendency to crumble the material, tear out tougher particles such as pieces of fruit, shift formed layers relative to each other with attendant grinding action, and with minimization or substantial elimination of attendant wastage and unsightly appearance resulting from broken and torn products and smearing of external surfaces thereof with gummed or compacted masses of crumbs and particles.

A more specific object of the present invention is the provision of such a method of dividing into layers cakes of non-homogeneous composition, such as fruit cakes, with minimum tendency to loosen, displace and/or pull out of the mass tougher pieces of fruit and the like during cutting or sawing into layers, and to minimize grinding of adjacent cut surfaces with attendant crumbling which may occur with excessive displacement or relative shifting of layers more likely to result from greater degrees of lateral drag attendant upon the sawing or cutting of more than one layer at a time.

Another object of the invention is to provide such a method which features defining one layer at a time by a cut in a predetermined efficient order so that there is always maintained a firm single mass of cake material between cutting means and the transporting means which moves the cakes forward as they are layered so that restraining and transverse shifting tendencies of cutting means during layering action will not oppose advancing force of the transporting means in such fashion as to tend to shift relatively separated portions along an intermediate plane of severance with attendant or resultant grinding, crumbling, and other difficulties or undesired characteristics.

A further object of the invention is the provision of such method which is characterized by cake side-motion staying, preventing transverse shifting of cakes or layers thereof during cutting beyond a certain predetermined limit, with such staying being of a character that permits effective carrying off of crumbs or particles which minimizes or eliminates tendency to collect or compact them into masses adhering to or smearing external surfaces of the layered cakes in unsightly fashion, and which also reduces to a minimum drag or restraint with respect to forward motion.

A still further object of the invention is to provide simple commercially efficient apparatus which in operation will effectively perform the method and attain the desired ends, and structural embodiments thereof which are readily constructed and allow efficient use and operation thereof.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing, in which:

Fig. 1 is a side elevational view of an embodiment of apparatus of the present invention diagrammatically illustrating practice of the method;

Fig. 2 is a view similar to Fig. 1 of another embodiment of the apparatus;

Fig. 3 is a cross-sectional view taken at the top layering station of apparatus of the invention similar to that shown in either Figs. 1 or 2, showing certain parts somewhat schematically;

Fig. 4 is an enlarged top plan view of a cake which has been, or is to be, layered in accordance with the present invention;

Fig. 5 is a side elevational view of a cake which is similar to that shown in Fig. 4 but which has been layered; and Fig. 6 is an enlarged top plan view, with parts in section and broken away, of apparatus of the present invention showing at a layering station a form of cake side-motion staying means different from those depicted in Figs. 1 and 2.

Referring to the drawing, like numerals identify similar parts throughout and, as seen in Fig. 1, an embodiment of the apparatus may comprise a cake transporting means in the form of an endless belt 9 lapped around rolls 10 and 11 one of which may be driven to cause the top run 12 of the belt to move forward in the direction of the arrow. At 13 along the path of forward motion of a cake, defined by the upper run 12 of belt 9, is located a first or top layering station. At that station is mounted cutting means in the form of a band saw 14 having a cutting portion or upper run 15 arranged substantially transversely of the upper run 12 of the belt in a cutting plane substantially parallel to the plane of the path of forward motion or top surface of the upper run of the belt. As shown, the cutting portion or upper run 15 of the band saw 14 is located an appreciable distance above the top surface of the upper run 12 of the belt. The band saw 14 is suitably mounted on a pair of wheels or pulleys 16, 16, one of which may be driven by its shaft 17 from any suitable power source.

Cake side-motion staying means 18 is located at least at the top layering station 13 alongside the path of forward motion or top run 12 of belt 9, and such means is arranged at least along the side toward which the cutting portion or upper run 15 of band saw 14 moves on the cutting stroke. In the arrangement of Fig. 1, such staying means 18 is arranged on the far side of the upper run 12 of the belt, and by way of example may comprise a pair of fixed supports 19, 19 on which are mounted a pair of substantially horizontal elongated, relatively narrow, vertically spaced-apart, guide elements 20, 20 in the form of wires or rods. The wires or rods are preferably circular in cross-section so as to provide contacting portions which will have approximate line contact with the side of a cake to be moved forward thereagainst or in abutment therewith. As shown in Fig. 1, one guide element 20 is arranged above the cutting plane defined by the upper run 15 of the band saw 14, and the other guide element 20 is arranged therebelow. In other words, the upper run 15 of the band saw travels between the two guide elements 20, 20, as is more clearly indicated in Fig. 3.

Preferably, the upper run 15 of the band saw 14 is guided by any suitable means, such as by a pair of spaced-apart guide elements or blocks 21, 21 mounted on any suitable fixed support, such as an angle iron 22. Preferably two pairs of guide blocks 21, 21 are provided, one on the approach side of belt 9 and one on the far side of the belt beyond the guide elements 20, 20, as is proposed in Fig. 3. The pair of guide blocks 21, 21 on the approach side may be mounted, if desired, upon laterally adjustable means so as to be moved over nearer toward a cake to be cut, for example, to the position shown in dotted lines at 121, 121, shown in Fig. 3. Such cutting blade or saw guide blocks 21, 21 are provided to steady the cutting portion as it passes through the cake.

The apparatus just described is preferably substantially duplicated as shown in Fig. 1, but with the addition of another or third staying or guide element 23 interposed between the bottom guide element 20 and the upper run 12 of the belt 9. If desired the upper staying or guide element 20 may be omitted. The upper run 15 of the band saw 14 of this second apparatus is located in a cutting plane lower than the cutting plane of the cutting means at the top layering station 13. This second cutting plane is intermediate of lower guide element 20 and the additional guide element 23, and the position of the cutting means locates a second layering station 24.

Intermediate the delivery end at roll 11 of endless belt 9 of the first apparatus and the receiving end of the second endless belt 9 at its roll 10 is located a transfer means or device which may comprise an endless belt 25 lapped around rolls 26, 26. The rolls 26, 26 may be freely rotatable, in which case belt 25 will be an idle transfer means, provided, of course, suitable procedure or additional means are practiced or provided which will assure forward feed of cakes from the first apparatus to the second. If cakes are fed successively through the composite apparatus so that each trailing one may push the preceding one forward, such transfer belt 25 may be an idle transfer means. However, if it is desired to move the cakes forward in spaced relation, transfer belt 25 may be driven in any suitable manner, such as by driving one of the two rolls 26, 26. Of course, such transfer means may be in form of a plurality of juxtaposed rolls similar to rolls 26, 26, with belt 25 omitted.

In operation of the composite apparatus schematically shown in Fig. 1, a cake, such as that shown at 27, may be fed forward by the upper run 15 of the first belt 9. Such cake, as shown in Fig. 4, may be of a well known type of fruit cake having pieces of fruit and raisins bound together or distributed through a baked, sweetened dough mass. It may be substantially circular in plan, of any suitable diameter, such as about six to eight inches (6–8 ins.), and of any appreciable desired height, such as about three to three and one-half inches (3–3½ ins.). As shown in Figs. 4 and 5, such cake 27 may be baked in a cup-shaped corrugated paper pan liner 28, which remains on the cake body when removed from the pan. It may be desired transversely to layer, sever or cut the cake 27 with its paper cover 28 into three substantially horizontal layers about one inch (1 in.) in thickness to form a top layer 29, a bottom layer 30 and an intermediate layer 31. This will require the formation of a top cut 32 and a bottom cut 33. The cutting plane or position of the top cut 32 is indicated with a dotted line in Fig. 1.

The cake unit 27, preferably as one of a series arranged in succession, is moved forward by the upper run 12 of the first endless belt 9 toward the upper run or cutting portion 15 of the first band saw 14. The cake unit 27 initially may ride along in line contact with guide or staying elements 20, 20, or may be laterally spaced therefrom until shifted sideways, or lateraly, into contact with such staying guide elements by transverse impulse of the cutting portion 15 of the band saw at the top layering station 13. In handling such cake units of the approximate dimensions given, the guide or staying elements 20, 20 may be about one-quarter inch (¼ in.) in diameter and spaced apart about seven-eighths inch (⅞ in.). With the employment of three guide or staying elements 20, 20 and 23 each of about one-quarter inch (¼ in.) in diameter, the bottom element 23 may be spaced from the upper surface of the belt about one-half inch (½ in.) and the adjacent element 20 spaced therefrom about seven-eighths inch (⅞ in.), with a like spacing between the two elements 20, 20.

Since the cutting portion 15 of band saw 14 is traveling toward the guide or staying elements 20, 20, as the saw bites into the cake 27 along the cutting plane to define the top cut 32 the saw will tend to shift the cake laterally to abut against the guide elements 20, 20. The latter will thus limit cake side-motion shift during the cutting operation with the top guide element 20 holding in proper position the top layer 29 as it is severed from the major bottom portion of the cake resting upon the upper run 12 of the belt 9. The lower guide element 20 at the same time will limit the side shift of the bottom or major portion of the cake. Tendency of retardation of any cake relative to the transporting belt by the cutting means may be minimized by feeding a series of cakes forward in substantial juxtaposition to each other, so that the following cake, or aligned plurality thereof, moving with the belt will push the preceding cake forward during layering.

After the severed cake, having a top layer 29 defined by the top cut 32, has passed the top layering station 13, it is carried forward on top run 12 of belt 9 and then transferred to the top run 12 of the similar second endless belt 9 of the second layering device by means of the transfer belt 25, or similar means, the cut cake meanwhile retaining its top layer in substantially unshifted position. This cut cake, having top layer 29 defined therein, will then be transferred further forward, from the position shown at the right hand side of Fig. 1, to the second layering station 24 where the second band saw 14 having its cutting portion 15 traveling along a lower cutting plane will form the lower cut 33 to divide the cake into three layers 29, 30 and 31. The cutting operation at the second layering station 24 is substantially that at the top layering station 13, except that the additional guide element 23 stays the bottommost portion of the cake in the formation of the bottom layer 30, the bottom guide element of the pair 20, 20 stays the intermediate portion forming the middle layer 31, and the top guide element 20, though not essential, may aid in staying the top layer 29.

In commercial operation it has been found that a variety of types of cakes of crumbly material may be efficiently layered in the manner and by apparatus similar to that described above. This is particularly true with regard to cakes of non-homogeneous composition, such as fruit cakes composed of baked sweetened edible dough having disbursed therein tougher pieces of fruit, raisins, etc. Prior to the present invention, attempts to so layer fruit cakes were unsatisfactory since it was found that other means or methods of cutting would tend to loosen or pull out of position the pieces of fruit. A great deal of crumbling would result due in part to a tendency to shift layers or subdivisions laterally during cutting. Such shifting would grind adjacent surfaces together, resulting in excessive crumbling, in turn causing loosening of the firmer particles of fruit, and the resultant products were found to have such a bad appearance as to be not only unsightly but practically unsalable. Further, excessive crumbling caused undue wastage. Side-motion staying was found to help somewhat, but when it was attempted to form a plurality of cuts simultaneously, it was found that the plurality of saws in relatively near parallel planes caused excessive side pull on one or more portions or layers. Resultant lateral shifting of layers would so grind adjacent surfaces together as to greatly damage and reduce the size and distort the shape of the intermediate layers or middle layer.

It was found in the development of the present invention that some of the difficulties could be reduced by making a single cut at a time, that is, define the layers successively, one at a time. This reduced lateral saw drag on the whole mass and further reduced tendency for layers to shift relative to each other, thereby reducing grinding and attendant crumbling. The consequent firmness of the mass (due to lessened tendency to crumble) assured a more secure anchorage of the firmer fruit pieces in position. However, if a lower cut or cuts was or were made before a cut at a higher level, the transverse impulse of the cutting means in making the higher cut tended to exert a lateral shifting force upon portions already severed from the base portion of the cake resting upon and tending to cling to the forward moving transporting belt, thus causing relative movement between segregated portions below the cutting means, as between the base of the cake and one or more layers above the lower cut or cuts, with resulting grinding of adjacent surfaces along the lower cut or cuts. This difficulty was overcome by forming each succeeding single cut progressively from the top down. The first cut was formed at the highest elevation to form a top layer, the next cut was formed at the next lower cutting plane to define a second layer lying immediately beneath the top layer, and so on down through the cake. As a result, the unsevered or single mass which is provided between the transporting belt and the cutting means or portion of the saw forming each cut eliminated any tendency to cause such shifting of masses above a lower cut or cuts, or below the cut being formed, due to retarding and lateral shifting tendency of the saw during its cutting action and the transverse impulse thereof while the cake was being moved forward by the transporting belt.

It was found in development of the present invention that a flat staying surface of appreciable extent as side guiding flanges would give rise at times to certain difficulties, including increasing drag to such an extent as to cause shifting of layers during forward movement of a cake by the belt and including also a tendency to cause crumbs or pulled-out fruit particles resulting from the cutting to collect and pack into the grooves of the corrugated paper cup covering the sides and bottom of the cake, smearing and gumming of the sides of the cake resulting in unsightly appearance. Staying means, such as those described above, which have minimum contact with the sides of the cake and provide effective spaces for free carrying away of such crumbs and particles, were found, in accordance with the present invention, to overcome this last difficulty. The narrow zones of contact between the guiding or staying elements and the side of the cake permit free escape of such crumbs and fruit particles as are freed from the cake, without tendency to pack into container corrugations or to smear the sides of the cake, and further to reduce to a minimum frictional retardation to forward motion of the cake and its layers.

It has been found in commercial practice that the practice of such method and the employment of such apparatus efficiently produces a sightly and highly salable layered cake unit, more particularly a layered fruit cake, one of the most difficult products for bakeries to produce in mass production.

As shown in Fig. 2, one transporting means or endless belt 90 may be employed in lieu of the two belts 9, 9 and intermediate transfer belt 25. In such case the upper run 120 of the transporting belt 90 is long enough to extend between, through and beyond the top layering station 13 and the second layering station 24. In such case the guide elements 20, 20 and 23 may extend from near the receiving end to near the discharge end of the upper run 120 of the transporting belt 90. The cutting portion or upper run 15 of the band saw 14 at the top layering station 13 will be arranged to operate between the top and middle staying guide elements 20, 20 and the similar portion of band saw 14 at the second station 24 will be arranged to operate between the bottom staying guide element 23 and the next adjacent staying guide element 20 as shown. The operation of such apparatus is substantially the same as that described above in connection with the composite apparatus shown in Fig. 1. Although separate, positively operated means may be employed to retain position of the cake units on the upper runs of the transporting belts of the apparatus shown in either of Figs. 1 and 2, such as flights, each following cake is preferably used to push forward the next preceding cake. Such arrangement of the cake units in side-to-side contact is suggested in dotted lines in Fig. 2 at 271, 272, 273 and 274.

As shown in Fig. 3, preferably the return or bottom run 34 of the band saw 14 is caused to pass through certain cleaning apparatus which may comprise scraper blades 35, 35, water sprays 36, 36 arranged above a drip pan 37, wiping felts 38, 38, also preferably arranged above drip pan 37, oil sprays 39, 39 arranged above an additional drip pan 40, and additional wiping felts 41, 41, also preferably arranged above drip pan 40. The band saw 14 thus will be kept clean and provided with a thin film of oil to facilitate its movement through the cake mass on the cutting stroke.

It will be understood that although staying guide elements 20, 20 and 23 preferably are made circular in cross-section, they may be made of any other desired shape, continuous or discontinuous, and arranged end-to-end in rows or staggered, so long as the resulting staying means answers to the requirements indicated above. For example, as shown in Fig. 6, such staying means at any layering station may comprise a plurality of relatively thin disks 200 having their axes arranged substantially vertically with their planes located substantially parallel to the surface of the upper run 12 of the transporting belt and with their peripheral edges 201—201 arranged substantially in any plane desired along the side of the belt for contact with a cake unit 27. For this purpose a plate 42 may be provided which has a bottom flange 43 and a plurality of top lateral ears 44 between which are mounted shafts 45 supporting for free rotation the disks 200—200. A portion of the periphery 201 of each disk 200 extends through a slot 46 in the plate 42 for side contact with a cake unit 27. A plurality of such disks 200—200 may have their projecting peripheral portions inward of the plate 42 aligned to function similarly to one of the staying guide elements 20, 20 or 23 of Figs. 1 or 2 and additional groups of disks 200—200 may be mounted on the shafts 45—45 in substitution for the other staying guide elements 20 or 23 of Figs. 1 and 2. In such case the cutting portion 15 of the saw may operate through a hole 47 in the plate 42, and the upper and lower edges of that hole may serve as guide elements in substitution for guide blocks 21, 21.

It is to be understood that "cake" is used in the present specification and claims in the broader sense of a mass of matter concreted, congealed, or molded into a substantially solid mass or block which may be in a form which is rather flat than high. Such a cake may thus be, only by way of example, a relatively small mass or loaf of edible baked dough, more particularly, a baked loaf of sweetened edible composition, such as a fruit cake. The term "crumbly material" is used in the sense of material which is friable or easily falls or can readily be broken or parted into small fragments or pieces. "Slab" is used in the sense of a comparatively thick plate or slice of the material so cut as to be subdivided into slices or layers. The term "layer" is used in the sense of a slab which lies substantially flat or extends in a generally horizontal direction as contrasted with the word "slice" which extends substantially vertical or is rested on edge. The slab-forming blade or cutting means having a cutting portion which may be employed to advantage in the practice of the present method to form slab layers by subdivision of cakes may be any one of a plurality of well known instruments, such as a knife having a sharp keen edge or a saw-toothed edge, a circular saw, or a band saw having a run moving in one direction which serves as a cutting portion. Preferably such blade is so operated as to cause its cutting portion on the effective cutting stroke thereof to travel in a certain, predetermined, single direction as contrasted with a reciprocatory cutting action. "Staying" is employed to identify the restraining or holding back action of side guiding means which when the cake is abutted thereagainst will prevent further transverse movement, as may be imparted by the cutting stroke of the blade in a direction substantially transverse of the direction of forward motion of the cake, without preventing or stopping forward cake motion along a path substantially parallel to the guiding means. "Transverse" is not used in the limiting sense of substantially at right angles to a reference direction but in the sense of extending across or in a direction of interception of a reference line or path. For example, the cutting portion of the cake-severing blade may extend either at a definite oblique angle or at substantially right angles to the path of forward motion of the cake, as may be desired.

The elongated, substantially narrow, spaced-apart, staying guide elements or means which stay transverse or side motion of a forward-moving cake abutted thereagainst at the top layer station and at the succeeding or second layer station may be small wires, rods or ribbons of any desired cross-sectional shape having narrow zones of contact of some width or minimum zone contact as that attainable with line contact, and such staying guide elements may be continuous from station to station and through the same, or interrupted, either between stations or at the latter. One set of staying guide elements may be mounted at one station and a separate set of similar, or different, staying guide elements may be mounted at another station. Staying guide means at any station may comprise a plurality of relatively short narrow members arranged in alignment with juxtaposed ends spaced apart, or one or more rotatable relatively thin disks having their axes extending generally vertically and their edges arranged to be contacted by the side of the forward-moving cake. The staying guide means may be arranged at two or more stations on the same side of the path of forward motion of the cakes, or on alternate sides, or on both sides. In any case such staying guide means are preferably provided on at least the side of the conveyor towards which the transverse movement of the cutting means is directed on the cutting stroke. If, for example, staying guide means are arranged on one side at one station and on the opposite side at a second station the blade means at the first station should be given a motion on the cutting stroke in a transverse direction toward the staying guide means at that station and the blade means at the second station should be given a motion on its cutting stroke in the opposite transverse direction toward the staying guide means at the second station.

It will thus be seen that the objects set forth above and those indicated in the above description, among others apparent from the present disclosure, are efficiently attained and, since certain changes in carrying out the above process and in the construction set forth, which embody the invention, may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method of slabbing a cake of crumbly material into layers, comprising moving such a cake forward first past a top layering moving cutter, forming a substantially horizontal cut through the cake to define a top layer as the cake is moved past said moving cutter without layer removal and without substantially disturbing the material in the cut faces, moving the cut cake with its defined layer at the top thereof again forward now past a second layering moving cutter, and forming a second substantially horizontal cut through the cake along a plane lower than the plane of the first cut to define a lower second layer as the cut cake is moved past said second cutter without layer removal and without substantially disturbing the material in the cut faces.

2. A method of slabbing a cake of crumbly material into layers, comprising moving such a cake forward first past a moving cutter operating at a top layering station, staying the moving cake along one side in narrow spaced-apart zones at that station without stopping forward motion, cutting substantially horizontally through the moving cake from the side opposite the stayed side along a plane intermediate of zones of staying to define a top layer as the cake is moved past said top layering cutter and station, said cutting being performed without layer removal and without substantially disturbing the material in the cut faces, moving the cut cake with its defined layer at the top thereof further forward now past a second moving cutter operating at a second layering station, staying the moving cut cake along one side in narrow spaced-apart zones at the second station without stopping forward motion, and cutting substantially horizontally through the moving cut cake from the side opposite the side stayed at the second station along a plane which is lower than the first-mentioned plane and intermediate of zones of staying at the second station to define a lower second layer as the cut cake is moved past said second moving cutter and station, the second cutting also being performed without layer removal and without substantially disturbing the material in the cut faces.

3. A method of slabbing a cake of crumbly material into layers and retaining said layers in substantially the previous relative positions of said parts, which comprises moving such a cake forward along a path extending substantially horizontally past a top layering moving cutter and a second moving cutter, cutting a substantially horizontal top layer from said cake without material displacement of said layer and without substantially disturbing the material in the cut faces by said top layering cutter with the latter travelling substantially horizontally and transversely to the path of movement of said cake and intersecting the same, limiting transverse movement of said cake and layer under the impulse of said top layering cutter, moving the cut cake with its defined layer at the top thereof again forward along the path now past the second cutter operating similar to the top layering cutter, and while so moving the cut cake past said second cutter making a second substantially horizontal cut in said cake in a manner similar to that employed in making the top cut but in a plane between that of the top cut and that of the bottom of the cake.

4. A method of slabbing cakes of crumbly material into layers and retaining said layers in substantially the previous relative positions of said parts, which comprises moving a series of such cakes successively forward along a path extending substantially horizontally past a top layering moving cutter and a second moving cutter, successively urging the cakes forward along the path, while so urging the cakes forward successively, cutting a substantially horizontal top layer from each of said cakes without material displacement of said layer and without substantially disturbing the material in the cut faces by said top layering cutter with the latter travelling substantially horizontally and transversely to the path of movement of said cakes and intersecting the same, limiting transverse movement of said cakes and their top layers under the impulse of said top layering cutter, successively moving the cut cakes each with its defined layer at the top thereof again forward along the path now past the second cutter operating similar to the top layering cutter, and while so moving successively the cut cakes past said second cutter making in each a second substantially horizontal cut in a manner similar to that employed in making the top cut but in a plane between that of the top cut and that of the bottom of each of the cakes.

5. A method of slabbing a cake of crumbly material into layers, comprising moving such cake forward along a defined path extending beneath a moving cutter arranged substantially transversely of that path and in a cutting plane which is substantially parallel to and elevated an appreciable distance above that path, staying lateral movement of the cake as it is moved along its defined path, actuating said cutter along the cutting plane as the cake is moved forward therepast while being stayed laterally to form a transverse cut through the cake defining a top layer without layer removal and without substantially disturbing the material in the cut faces, again moving the cut cake with its defined layer at the top thereof further forward along a path extending beneath a second moving cutter arranged substantially transversely of the second path in a cutting plane which is substantially parallel to and elevated above the second-mentioned path a distance appreciably less than the first-mentioned distance, staying lateral movement of the cut cake as it is moved along the second-mentioned path with its defined layer uppermost, and actuating said second cutter along its cutting plane as the cut cake is moved forward therepast to form a second transverse cut in the cake below the first cut to define a lower second layer without layer removal and without substantially disturbing the material in the cut faces.

6. Apparatus for slabbing a cake of crumbly material comprising, in combination, means to move such cake forward along a defined path, a top layering station and a succeeding second layering station located along the path with the former arranged ahead of the latter in the direction of cake forward motion, motive cutting means at said top layering station having a relatively thin smooth-sided sawing portion extending substantially transversely of the path along a plane substantially parallel to and at an appreciable elevation above the path at that station to sever the top portion of the cake from the remainder thereof to define a top layer without layer removal and without substantially disturbing the material in the cut faces as the cake is moved forward, and second motive cutting means at the second station also having a relatively thin smooth-sided sawing portion extending substantially tranversely of the path along a plane substantially parallel to and at an appreciable elevation above the path at the second station but appreciably lower than the first cutting plane to form a second transverse cut through the cake below the first cut to define a lower second layer without layer removal and without substantially disturbing the material in the cut faces.

7. Apparatus for slabbing a cake of crumbly material comprising, in combination, means to move such cake forward along a defined path, a top layering station and a succeeding second layering station located along the path with the former arranged ahead of the latter in the direction of cake forward motion, motive cutting means at said top layering station having a relatively thin smooth-sided sawing portion extending substantially transversely of the path along a plane substantially parallel to and at an appreciable elevation above the path at that station to sever the top portion of the cake from the remainder thereof to define a top layer without layer removal and without substantially disturbing the material in the cut faces as the cake is moved forward, second motive cutting means at the second station also having a relatively thin smooth-sided sawing portion extending substantially transversely of the path along a plane substantially parallel to and at an appreciable elevation above the path at the second station but appreciably lower than the first cutting plane to form a second transverse cut through the cake below the first cut to define a lower second layer without layer removal and without substantially disturbing the material in the cut faces, and side guiding means located along the path at each station adapted to stay transverse movement of the cake without stopping its forward motion, said guiding means at each station comprising a plurality of vertically spaced elements with at least one thereof located above and another located below the cutting plane at that station, said elements having narrow contact portions adapted to have contact with a side of the cake in narrow spaced-apart zones on opposite sides of the cutting plane.

8. Apparatus for slabbing a cake of crumbly material comprising, in combination, means to move such cake forward along a defined path, a top layering station and a succeeding second layering station located along the path with the former arranged ahead of the latter in the direction of cake forward motion, motive cutting means at said top layering station having a relatively thin smooth-sided sawing portion extending substantially transversely of the path along a plane substantially parallel to and at an appreciable elevation above the path at that station to sever the top portion of the cake from the remainder thereof to define a top layer without layer removal and without substantially disturbing the material in the cut faces as the cake is moved forward, second motive cutting means at the second station also having a relatively thin smooth-sided sawing portion extending substantially transversely of the path along a plane substantially parallel to and at an appreciable elevation above the path at the second station but appreciably lower than the first cutting plane to form a second transverse cut through the cake below the first cut to define a lower second layer without layer removal and without substantially disturbing the material in the cut faces, and side guiding means located along the path at each station adapted to stay transverse movement of the cake without stopping its forward motion, said guiding means at each station comprising at least a pair of elongated substantially narrow spaced-part guide elements located on opposite sides of the cutting plane at that station for contact with a side of the cake in narrow zones below and above the cutting plane.

9. Apparatus for slabbing a cake of crumbly material comprising, in combination, means to move such cake forward along a defined path, a top layering station and a succeeding second layering station located along the path with the former arranged ahead of the latter in the direction of cake forward motion, motive cutting means at said top layering station having a relatively thin smooth-sided sawing portion extending substantially transversely of the path along a plane substantially parallel to and at an appreciable elevation above the path at that station to sever the top portion of the cake from the remainder thereof to define a top layer without layer removal and without substantially disturbing the material in the cut faces as the cake is moved forward, means to actuate said sawing portion in one certain direction on the cutting stroke thereof, second motive cutting means at the second station also having a relatively thin smooth-sided sawing portion extending substantially transversely of the path along a plane substantially parallel to and at an appreciable elevation above the path at the second station but appreciably lower than the first cutting plane to form a second transverse cut through the cake below the first cut to define a lower second layer without layer removal and without substantially disturbing the material in the cut faces, means to actuate said second-mentioned sawing portion in one certain direction on the cutting stroke thereof, cake side-motion staying means at said top layering station comprising a plurality of vertically spaced elements each having a narrow cake-contact portion disposed adjacent the path on the side thereof toward which the cutting portion at that station is actuated on the cutting stroke with at least one of said elements mounted above and another below the cutting plane, and cake side-motion staying means at said second layering station comprising a plurality of vertically spaced elements each having a narrow cake-contact portion disposed in similar fashion with respect to the path, the cutting plane and the direction of actuation of the cutting portion at the second station.

10. Apparatus for slabbing a cake of crumbly material comprising, in combination, means to move such cake forward along a defined path, a top layering station and a succeeding second layering station located along the path with the former arranged ahead of the latter in the direction of cake forward motion, motive cutting means at said top layering station having a relatively thin smooth-sided sawing portion extending substantially transversely of the path along a plane substantially parallel to and at an appreciable elevation above the path at that station to sever the top portion of the cake from the remainder thereof to define a top layer without layer removal and without substantially disturbing the material in the cut faces as the cake is moved forward, means to actuate said sawing portion in one certain direction on the cutting stroke thereof, second motive cutting means at the second station also having a relatively thin smooth-sided sawing portion extending substantially transversely of the path along a plane substantially parallel to and at an appreciable elevation above the path at the second station but appreciably lower than the first cutting plane to form a second transverse cut through the cake below the first cut to define a lower second layer without layer removal and without substantially disturbing the material in the cut faces, means to actuate said second-mentioned sawing portion in one certain direction on the cutting stroke thereof, and cake side-motion staying means at each station each comprising a plurality of vertically spaced elongated narrow elements disposed adjacent the path on the side thereof toward which the cutting portion at that station is actuated on the cutting stroke with at least one of said elements mounted above and another below the cutting plane at that station.

JOSEPH H. SAUTER.
JOSEPH EDMUND BYRNE.

REFERENCES CITED

The following references are of record in the file of this patent:

UNITED STATES PATENTS

| Number | Name | Date |
|---|---|---|
| 1,384,732 | Schermer | July 12, 1921 |
| 1,665,888 | Litty | Apr. 10, 1928 |
| 1,890,676 | Fox | Dec. 13, 1932 |
| 1,992,688 | Bonvallet | Feb. 26, 1935 |
| 2,341,052 | Lurmann et al. | Feb. 8, 1944 |
| 2,347,007 | Tod | Apr. 18, 1944 |
| 2,115,102 | Gottfried et al. | Apr. 26, 1938 |